(No Model.)

I. J. HARTFORD.
STOCK WATERING TANK.

No. 542,704. Patented July 16, 1895.

Witnesses
Wm. C. Cashiee
May E. Moore

Isaac J. Hartford
Inventor
By Wm. N. Moore
Attorney

United States Patent Office.

ISAAC J. HARTFORD, OF SAVANNAH, MISSOURI.

STOCK-WATERING TANK.

SPECIFICATION forming part of Letters Patent No. 542,704, dated July 16, 1895.

Application filed April 13, 1895. Serial No. 545,630. (No model.)

*To all whom it may concern:*

Be it known that I, ISAAC J. HARTFORD, a citizen of the United States, residing at Savannah, in the county of Andrew and State of Missouri, have invented certain new and useful Improvements in Stock-Watering Tanks, of which the following is a specification, reference being had therein to the accompanying drawings.

My invention relates to improvements in stock-watering tanks; and the object of my invention is the provision of a stock-watering tank which will be of simple and inexpensive construction, which will insure a fresh supply of water at all times and retain the same in a cool condition, and which will be thoroughly practical for the intended purpose.

To attain the desired objects, my invention consists of a stock-watering tank embodying novel features of construction and combination of parts, substantially as disclosed herein.

Figure 1:
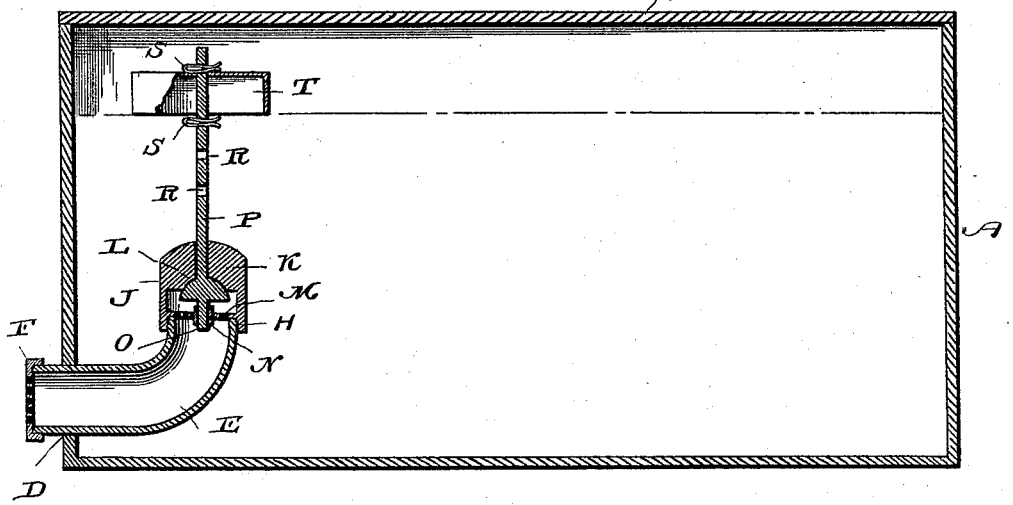
Figure 2:
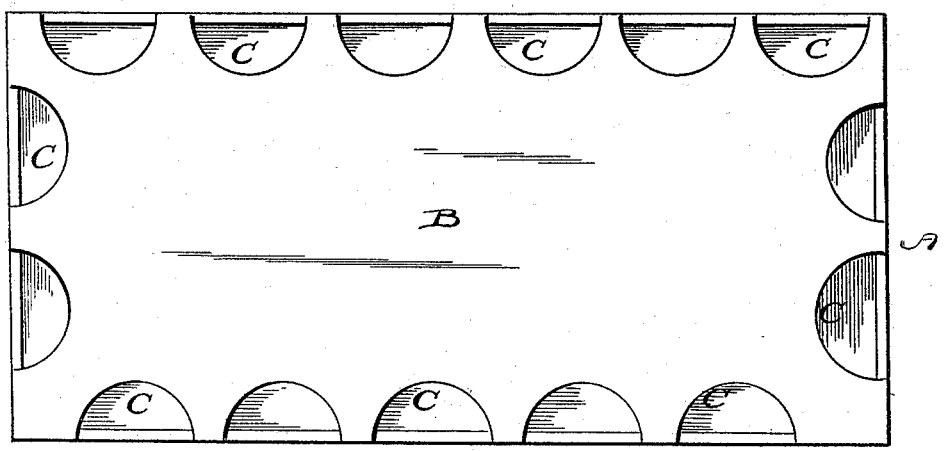

Figure 1 represents a vertical sectional view of my improved stock-watering tank, and Fig. 2 represents a plan view thereof.

In the drawings, A designates the tank proper, which is provided with the cover or lid B, having a series of openings C, to admit the nose of the animal for drinking, and further provided at its lower portion with the inlet-opening D. Entering said inlet-opening is the feed or supply pipe E, having at its inlet end the strainer F, to prevent the entrance of sticks or other foreign matter, and having its inner G formed with an elbow or curve and provided with exterior screw-threads H, which receive the ferrule or sleeve J, having the annular ring K at its upper portion formed with the curved valve-seat L, and having formed therein near its lower portion the strainer or filter M, having a guide N for the lower end O of the valve P, having its upper curved portion adapted for the seat, the stem Q extending upward from the valve and provided with a series of openings R to receive the pins S for holding the float T in place, said pins permitting the float to be adjusted so that the water-level in the tank may be varied and the float adjusted accordingly.

The operation of my invention will be readily understood, and I will simply state that the water passes into the supply-pipe, the foreign matter being removed by the first strainer, and from thence it passes through the second strainer into the tank, where it may be drank by the animals through the openings in the cover, and when the water reaches the float the float rises and closes the valve.

I claim—

1. In a stock watering tank, the combination of the supply pipe having the curved inner end, the ferrule or sleeve secured to said inner end, the curved valve seat carried by said sleeve, the strainer secured in said sleeve, the valve having the depending guide passing through the strainer and having the stem projecting above the same and carrying the float.

2. In a stock watering tank, the combination of the tank having the cover provided with the series of openings, the supply pipe having the strainer at its inlet end and having its exit end formed with an elbow, the sleeve connected to said elbow and carrying the strainer and valve seat, the valve fitting in said sleeve and having the depending guide arranged in the strainer and having the stem projected upward and formed with a series of openings, a float adjustable on said stem, and a movable pin for holding the float at any adjustment.

In testimony whereof I affix my signature in presence of two witnesses.

ISAAC J. HARTFORD.

Witnesses:
C. A. COWLES,
WILLIAM COOK.